United States Patent [19]
Meriwether et al.

[11] Patent Number: 5,931,913
[45] Date of Patent: Aug. 3, 1999

[54] METHODS, SYSTEM AND COMPUTER PROGRAM PRODUCTS FOR ESTABLISHING A SESSION BETWEEN A HOST AND A TERMINAL USING A REDUCED PROTOCOL

[75] Inventors: Teresa Anne Meriwether, Cary; Peter Williams Volkmar; Ian Beaumont Shields, both of Raleigh, all of N.C.

[73] Assignee: International Business Machines Corporation, Armonk, N.Y.

[21] Appl. No.: 08/852,461

[22] Filed: May 7, 1997

[51] Int. Cl.$^6$ ...................................................... G06F 17/00
[52] U.S. Cl. ........................................... 709/227; 709/234
[58] Field of Search .......................... 395/200.33, 200.6, 395/200.61, 200.64, 200.66, 200.76, 200.78, 200.57, 200.58; 355/500; 370/338

[56] References Cited

U.S. PATENT DOCUMENTS

| | | | |
|---|---|---|---|
| 5,021,949 | 6/1991 | Morten et al. | 364/200 |
| 5,159,592 | 10/1992 | Perkins | 370/85.7 |
| 5,727,159 | 3/1998 | Kikinis | 395/200.76 |
| 5,754,830 | 5/1998 | Butts et al. | 395/500 |

OTHER PUBLICATIONS

Newton's Telecom Dictionary, Newton, H, Flatiron Publishing, p. 661, 1998.

Postel et al., Telnet Protocol Specification, RFC 854, May 1983.

Rekhter, "Tenet 3270 Regime Option", RFC 1041, T.J. Watson Research Center, IBM, Jan. 1988.

Penner, "TN 3270 Current Practices", RFC 1576, DCA, Inc., Jan. 1994.

Postel et al., "Telnet Option Specification", RFC 855, ISI, May 1983.

*Primary Examiner*—Ellis B. Ramirez
*Attorney, Agent, or Firm*—Myers Bigel Sibley & Sajovec; Jeanine S. Ray-Yarletts

[57] ABSTRACT

A session is established between a terminal and host, each of which are operative to communicate according to a communications protocol. A communications channel is established between the terminal and the host via a client and a server of a communications network, the client being connected to the terminal and the server being connected to the host. Terminal type information is communicated from the client to the server via the communications channel. An indication of readiness to communicate data between the terminal and the host is communicated between the server and the client via the communications channel. Messages are communicated between the client and the terminal and between the server and the host according to the communications protocol to emulate communication of session establishment messages operative to establish a session between the terminal and the host according to the communications protocol without requiring communication of the session establishment messages via the communications channel. Related apparatus and computer program products are also discussed.

77 Claims, 5 Drawing Sheets

METHODS, SYSTEM AND COMPUTER PROGRAM PRODUCTS FOR ESTABLISHING A SESSION BETWEEN A HOST AND A TERMINAL USING A REDUCED PROTOCOL

FIELD OF THE INVENTION

The present invention relates to methods, systems and computer program products for communicating between a host and a terminal, more particularly, to methods, systems and computer program products for communicating between a terminal and a host over an intervening communications channel.

BACKGROUND OF THE INVENTION

Traditional mainframe computer configurations provided for user interface to the computer through computer terminals which were directly connected by wires to ports of the mainframe computer. An example of such a terminal is an IBM 3270 or IBM 5250 terminal which communicates with a mainframe (or host) using a Telnet protocol. A Telnet protocol typically provides for structured grouping of data stream transmissions with a series of control characters followed by a block of displayable characters, a typical data stream comprising a plurality of sequentially transmitted control character blocks followed by displayable character blocks.

As computing technology has evolved, processing power has typically moved from a more central computer model to a distributed environment with local area networks connecting individual work stations to networks linking a number of different local networks through devices such as, for example, routers. Furthermore, due to infrastructure limitations and cost, components of the "network" linking two devices wishing to communicate may include a low throughput component such as a wireless network link. Central mainframe computers continue to play a role in the networked environment. Accordingly, structured protocols such as the Telnet protocol are still in use. These applications may communicate with users over the network to terminals such as an IBM 3270 or, alternatively, to microprocessor based work stations executing software applications which allow the computers to act as a terminal.

Although host applications can be adapted to use a more state-of-the art communications infrastructure, the performance of a host application may be hampered by using lower bandwidth channels such as wireless or internet channels. For this reason, among others, conventional procedures for communicating between terminals and hosts may be disadvantageous in such environments. However, because of the large installed base of conventional host applications and terminals designed for using these applications, it may be cost ineffective or infeasible to extensively modify these existing applications to incorporate more efficient communications techniques suited to these environments.

Figure 1:
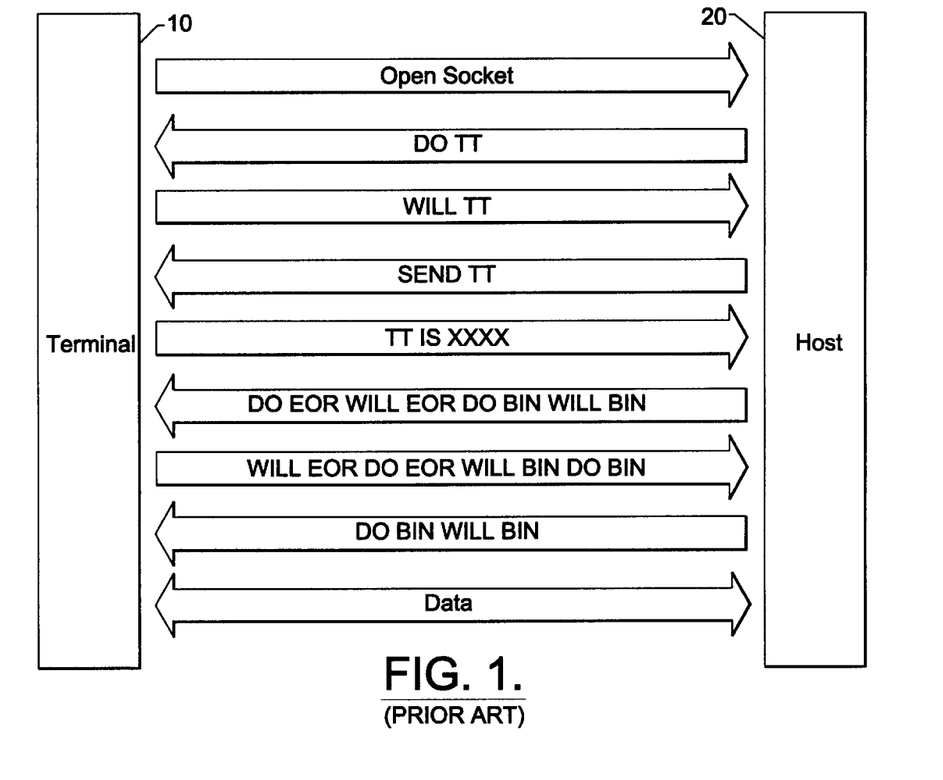
FIG. 1 is a flowchart illustration of a conventional Telnet logon procedure.

For example, a Telnet logon protocol for connecting a 3270 or 3250 terminal (or terminal emulator) to a host application includes several information transfers between the terminal and the host in order to establish a session. As illustrated in FIG. 1, a socket is opened by a Telnet terminal 10 for TCP connection to a Telnet host 20. The host 20 sends a "DO TT" Terminal Type option message to the terminal 10 which indicates that the host 20 is ready to perform Terminal Type negotiation. In response, the terminal 10 sends a "WILL TT" Terminal Type option message to the host 20 which indicates that the terminal 10 supports Terminal Type negotiation. The host 20 responds by sending a "SEND TT" message which requests that the terminal 10 send its terminal type, e.g., a value indicating whether the terminal 10 is a 3270 or 5250 type terminal. In response, the terminal 10 sends a message including the appropriate terminal type. The host 20 responds with a transfer including "DO EOR WILL EOR DO BIN WILL BIN" option messages which requests the terminal 10 to communicate using the Telnet end of record and binary transmission options. The terminal 10 responds by sending a transfer including "WILL EOR DO EOR WILL BIN DO BIN" option messages indicating support for these options. The host 20 then repeats the "DO BIN WILL BIN" option messages, and data may then flow between the terminal 10 and the host 20.

The Telnet logon procedure illustrated in FIG. 1 involves eight individual transfers over the communications channel which connects the terminal and the host before data begins to flow. In a lower bandwidth environment, this number of transfers can represent a significant amount of overhead which can impact the performance of a Telnet application, especially applications involving frequent connection and disconnection of the terminal and host.

To address communications performance problems in low-bandwidth environments such as wireless environments, conventional techniques have focused on accelerating communications at the application level. For example, a disconnect function has been used in VM which allows a user to disconnect from a Systems Network Architecture (SNA) application for a period of time and reconnect at the same point in the application at which the user disconnected, thus potentially reducing the overhead associated with reconnecting to the application. Similarly, a short hold mode has been implemented in SNA applications which allows a physical link, such as an X.25 modem, to be shut down during periods of no traffic in an SNA session without taking down the overlying SNA session. Unfortunately, however, these approaches typically involve modification of the SNA application and/or communications protocol to incorporate these new functions, which may be cost-ineffective for existing SNA applications.

SUMMARY OF THE INVENTION

In light of the foregoing, it is an object of the present invention to provide methods, systems and computer program products for establishing a session between a terminal and a host which more efficiently use communications resources.

It is another object of the present invention to provides efficient methods, systems and computer program products for establishing a session between a terminal and a host which do not require modification of the terminal or the host application.

These and other objects, features and advantages are provided according to the present invention by methods, systems and computer program products for establishing a session in which a session between a host and a terminal which are operative to communicate according to a logon protocol, e.g., a Telnet protocol, is established using a reduced protocol on an intervening channel, i.e., a TCP channel, the reduced protocol mapping transfers of the logon protocol into a reduced number of transfers over the intervening communications channel. Preferably, the terminal and the host are operative to establish a session according to a Telnet protocol such as a 3270 or a 5250 logon protocol. A session is established by mapping the transfers of the protocol to a reduced number of transfers over the intervening communications channel between a client which communicates with the terminal using the Telnet protocol and a server which communicates with the host using the Telnet protocol. Messages are communicated between the client and the terminal and between the server and the host to emulate host/terminal communications according to the Telnet protocol.

The present invention stems from the realization that in an environment in which a terminal is connected to a host by a communications channel, buffering and emulation of protocol messages at a client and a server of the communications channel can be used to help reduce the number of transfers needed to establish a session between the terminal and the host, effectively providing a reduced protocol for establishing the session over the communications channel. Reducing the number of transfers over the communications channel can help reduce the overhead associated with establishing a session, especially when the communications channel has a relatively low bandwidth, e.g., in wireless and internet environments. Accordingly, performance degradation can be reduced when migrating an existing application to a new communications environment, without requiring modification of the application. In addition, reduction of the number of transfers can reduce costs associated with operating the application over the communications channel.

In particular, according to the present invention, a session is established between a terminal and host, each of which are operative to communicate according to a communications protocol. A communications channel is established between the terminal and the host via a client and a server of a communications network, the client being connected to the terminal and the server being connected to the host. Terminal type information is communicated from the client to the server via the communications channel. An indication of readiness to communicate data between the terminal and the host is communicated between the server and the client via the communications channel. Messages are communicated between the client and the terminal and between the server and the host according to the communications protocol to emulate communication of session establishment messages operative to establish a session between the terminal and the host according to the communications protocol without requiring communication of the session establishment messages via the communications channel.

Establishment of the communications channel may include communicating between the client and the server a confirmation of establishment of the communications channel. The indication of readiness to communicate data between the terminal and the host may be communicated by communicating an explicit message between the client and the server, or may involve communicating data between the client and the server to implicitly indicate readiness to communicate data between the terminal and the host.

The communications network may include a packet data network which operates according to a transmission control protocol (TCP), and wherein the step of establishing a communications channel comprises the step of opening a socket for TCP communication between the terminal and the host. The communications protocol may include a Telnet protocol, and the messages communicated between the terminal and the client and between the server and the host may include Telnet terminal type option, end of record option, and binary transmission option messages between the client and the terminal and between the server and the host. The terminal may be a terminal emulator resident on a first computer upon which the client also resides in the form of a client application. The server may be a server application resident on a second computer.

According to another aspect of the invention, a session may be established between a terminal and a host over a communications medium, the terminal and the host each being operative to establish a session according to a Telnet logon protocol which includes a first number of transfers between a host and a terminal. The session may be established between the terminal and the host via the communications medium using a reduced protocol which comprises a mapping of the first number of transfers according to the Telnet logon protocol to a second number of transfers via the communications medium, the second number of transfers being less than the first number of transfers. The second number of transfers may include less than five transfers, including a first transfer establishing a communications channel between the host and the terminal via the communications medium, a second transfer confirming establishment of the communications channel, a third transfer of terminal type information, and a fourth transfer indicating readiness to communicate data between the host and the terminal. According to another aspect, the second number of transfers may include less than four transfers, including a first transfer establishing a communications channel between the host and the terminal via the communications medium, a second transfer of terminal type information, and a third transfer indicating readiness to communicate data between the host and the terminal. The reduced protocol may include a mapping of terminal type option, binary transmission option and end of record option messages to the second number of transfers.

The communications medium may include a client which is operative to communicate with the terminal according to the Telnet logon protocol and a server which is operative to communicate with the host according to the Telnet logon protocol. A session may be established by communicating messages between the terminal and the client according to the Telnet logon protocol to thereby emulate communications between the terminal and the host according to the Telnet logon protocol, communicating messages between the host and the server according to the Telnet logon protocol to thereby emulate communications between the terminal and the host according to the Telnet logon protocol, and conducting the second number of transfers between the client and the server. The client and the server may be operative to communicate according to a transmission control protocol (TCP), and the step of conducting the second number of transfers comprises the step of conducting TCP transfers between the client and the server.

According to another aspect of the present invention, a method of mediating communications for a terminal operative to establish a session with a host according to a logon protocol on a client of a communications network which is connected to the terminal includes establishing a communications channel to a server of the communications network. Terminal type information is transmitted to the server via the communications channel. The client communicates with the server via the communications channel an indication of readiness to communicate data between the terminal and the host. Messages are communicated with the terminal to emulate communication of session establishment messages between the terminal and a host according to the logon protocol without requiring communication of the session establishment messages via the communications channel.

According to another aspect, communications for a host operative to establish a session with a terminal according to a logon protocol are mediated by a server of a communications network connected to the host. A communications channel is established to a client of the communications network. Terminal type information is received from the client via the communications channel. An indication of readiness to communicate data between the terminal and the host is communicated with the client via the communications channel. Messages are communicated with the host to emulate communication of session establishment messages between the terminal and a host according to the logon protocol without requiring communication of the session establishment messages via the communications channel.

As will be appreciated by those of skill in this art, the above described aspects of the present invention may also be provided as apparatus or computer readable program means.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. Those skilled in the art will appreciate that although the embodiment herein may be especially advantageous for use in wireless communications systems, the invention may be embodied in many different forms, e.g., distributed networks such as internets and intranets, and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
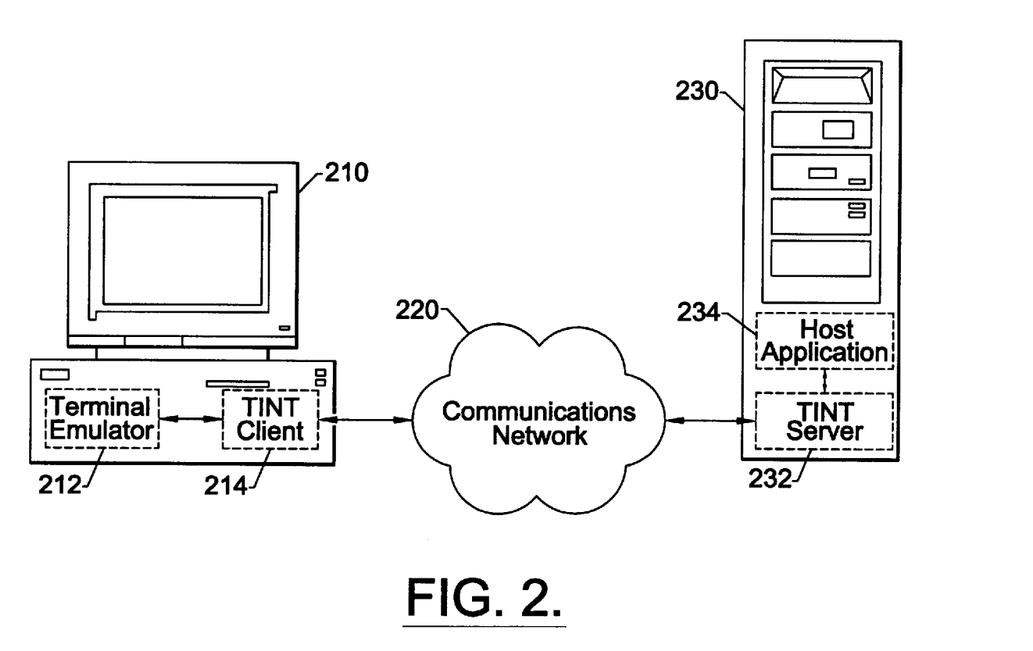
FIG. 2 is a schematic diagram of a system for establishing a session between a host and a terminal according to the present invention.

FIG. 2 illustrates a system for interconnecting a terminal, here shown as a terminal emulator application 212, e.g., a 3270 or 5250 terminal emulator, resident on a first computer 210, and a host, here shown as a host application 234 resident on a second computer 230. The terminal 212 and the host 234 are both operative to communicate according to a communications protocol. For example, the terminal and the host may produce messages according to a Telnet protocol, as described in the publication "*TN3270 Current Practices*" *RFC* 1576, by J. Penner (Jan. 1994).

A communications network 220 includes a client 214 resident at the first computer 210 and connected to the terminal 212, and a server 232 resident at the second computer 230 and connected to the host 234. For the illustrated embodiment, the client 214 and the server 232 comprise a Telnet Intercept (TINT) client and a TINT server, respectively, which operate to intercept Telnet protocol data streams for conversion to another protocol, e.g., a packet data protocol such as a transmission control protocol (TCP), for communication across the network 220. The operation of TINT clients and servers is described in United States Patent Application entitled "Terminal Emulator Data Stream Differencing System" to Housel et al., filed concurrently herewith, the disclosure of which is incorporated herein by reference in its entirety.

The client 214 and the terminal 212 are shown as resident on the same computer 210 as might be appropriate for interface to a terminal emulator such as the terminal emulator (PCOMM), marketed by the assignee of the present invention. Those skilled in the art will appreciate, however, that the client 214 and the terminal 212 may also be implemented in separate computers or other data processing apparatus. Similarly, the server 232 and the host 234 may be implemented on the same computer or data processing apparatus, e.g., as applications running on a processor such as an IBM AS400, or may be implemented using separate computers or data processors, for example, by using a host 234 resident on an SNA computer which is interfaced to a network computer, router or similar apparatus on which the server 232 resides.

The communications network 220 may comprise a variety of communications media. For example, the communications network 220 may include a wireless communications medium such as a Cellular Digital Packet Data (CDPD) system, an internet or other medium. Those skilled in the art will appreciate that although benefits provided by the present invention may be most pronounced for a low-bandwidth communications medium such as a wireless medium, the present invention is also applicable to other communications media.

For the illustrated embodiment, the TINT client 214 is an application that mediates Telnet communications which the terminal emulator 212 would normally have with the Telnet host 234. From the viewpoint of the terminal emulator 212, the TINT client 214 appears to be a Telnet server, i.e., the TINT client communicates with the terminal emulator according to a Telnet protocol. Similarly, the TINT server 232 is an application that mediates Telnet communications which the Telnet host 234 would normally have with the terminal emulator 212, the TINT server 232 appearing as a Telnet terminal to the Telnet host 234 by communicating according to the Telnet protocol. The TINT client 214 and the TINT server 232 communicate according to a different protocol. In particular, a session is established between the terminal 212 and the host 234 using a reduced protocol which represents a mapping of the normal session establishment messages used by the host 234 and the terminal 212 into a reduced number of transfers across the communications network 220.

Figure 3:
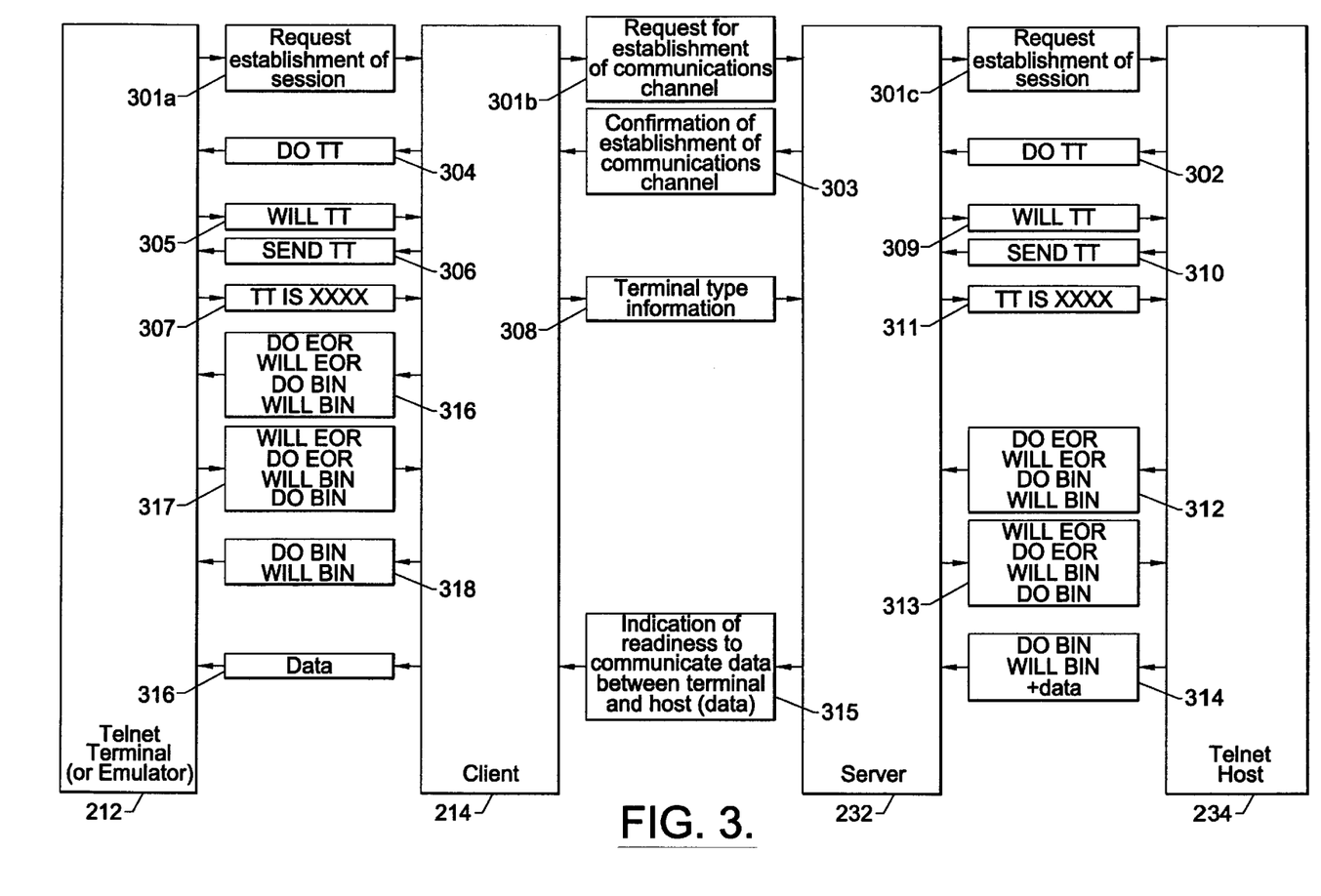
FIG. 3 is a flowchart illustration of operations for establishing a session between a terminal and a host according to an aspect of the present invention.
Figure 4:
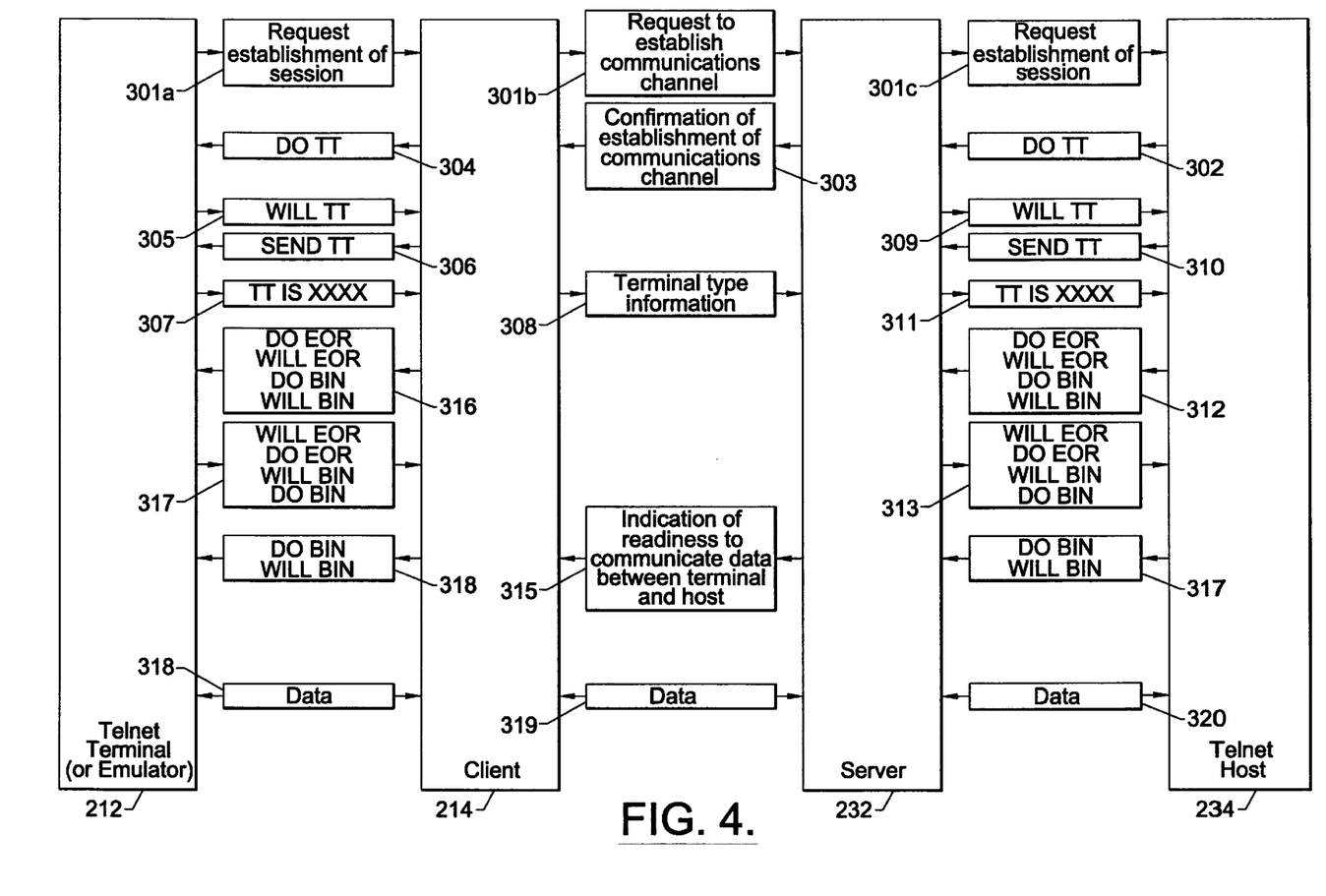
FIG. 4 is a flowchart illustration of operations for establishing a session between a terminal and a host according to another aspect of the present invention.
Figure 5:
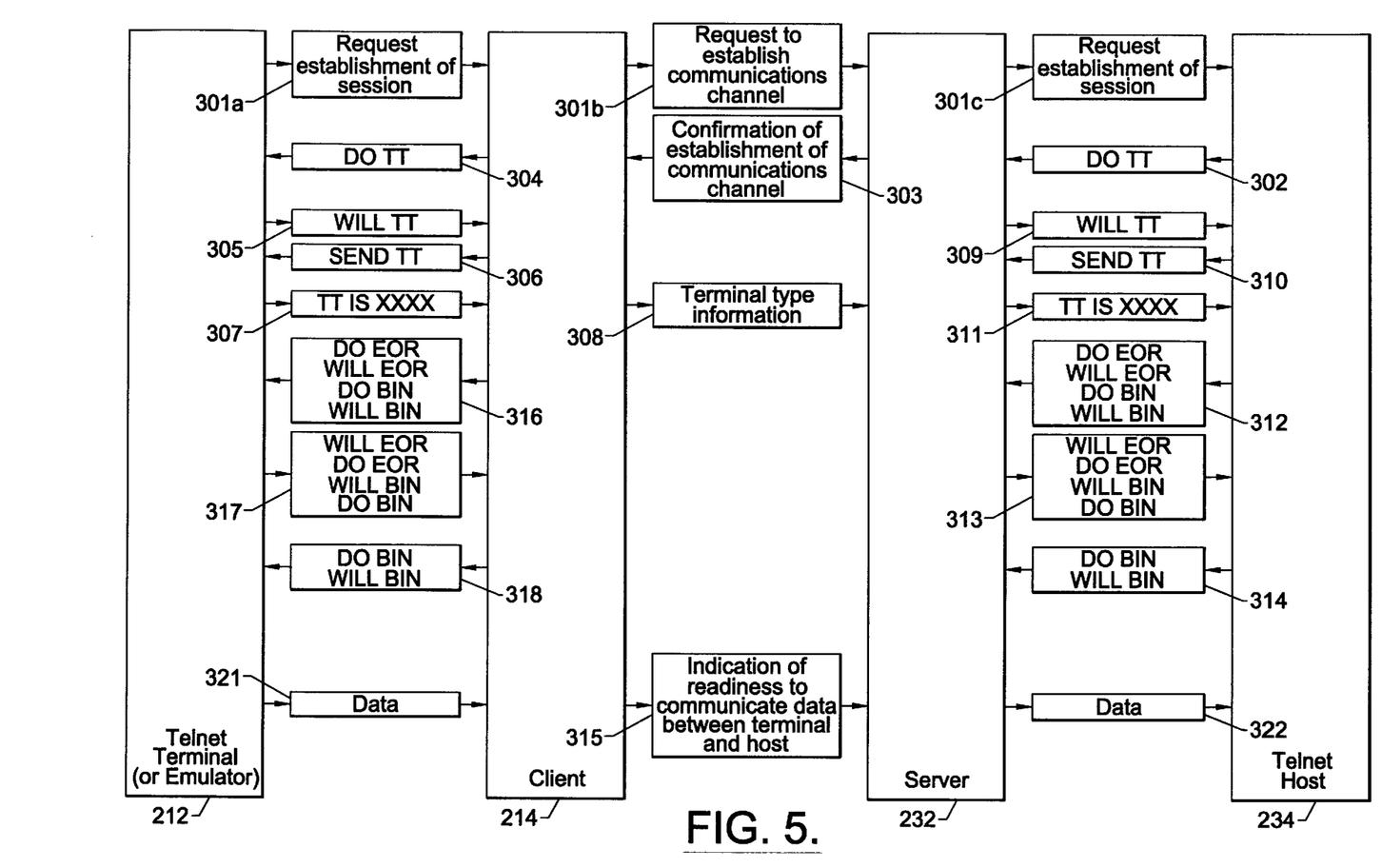
FIG. 5 is a flowchart illustration of operations for establishing a session between a terminal and a host according to another aspect of the present invention.

FIGS. 3–5 are flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIGS. 3–5 illustrate in detail operations for establishing a session between a host 234 and a terminal 212 using a reduced protocol according to various aspects of the present invention. When TINT is used to enhance a Telnet emulator session, the TCP connection between the terminal 212 and the host 234 is replaced with three separate connections. The first connection is created when the user starts a session by invoking an appropriate command at the terminal 212 to begin a Telnet session. A communications channel is established between the terminal 212 and the host 234 via the client 214 and the server 232, e.g., by the terminal 212 creating a connection to the client 214, creating a connection between the client 214 and the server 232, and creating a connection between the server 232 and the host 234. The connection between the client 214 and the server 232 may be based on various protocols, e.g., TCP.

Referring now to FIG. 3, a communications channel is established between the terminal 212 and the host 234 via the client 214 and the server 232. As illustrated the channel may be established by communication of a request from the terminal 212 to the client 214 to establish a session (Block 301a); for example, the terminal 212 may be an emulator program which automatically requests establishment of a Telnet session when the emulator is started. The request may be communicated to the server 232 (Block 301b), and, in turn, to the host 234 (Block 301c). In response to establishment of the communications channel, confirmation of establishment of the channel may be communicated from the server 232 to the client 214 (Block 303).

Upon transmitting of the request to establish a session to the client 214, a Telnet logon dialog can then commence between the terminal 212 and the client 214. Those skilled in the art will appreciate that with proper buffering and control, information communicated to the client 214 from the terminal 212 and the server 232 can be communicated from the client 214 to emulate a Telnet dialog. For example, as illustrated, terminal type negotiation (Blocks 304, 305, 306, 307), as well as end of record option and binary transmission option negotiation (Blocks 316, 317, 318) can occur, with or without receiving confirmation of the establishment of the communications channel to the host 234. For example, terminal type information received at the client 214 from the terminal 212 may be cached at the client 214 until confirmation of establishment of the communications channel is received at the client 214 and transmitted to the server 232 (Block 308) upon receipt of confirmation of the establishment of the channel, as might be appropriate for a TCP connection between the client 214 and the server 232. Those skilled in the art will appreciate, however, that in environment in which confirmation may not be received, e.g., a UDP environment, the terminal type information may be transferred without confirmation of the channel.

On the host side of the server, the server 232 and the host 234 may similarly engage in a Telnet dialog. Upon receipt of a request to establish a session, the server 232 and the host 234 may engage in terminal type negotiation (Blocks 302, 309, 310), culminating with transfer of terminal type information received at the server 232 to the host 234 (Block 311). The server 232 and the host 234 may then proceed with end of record option and binary transmission option negotiation (Blocks 312, 313).

The session establishment procedure is completed by communicating an indication of readiness to communicate data between the terminal 212 and the host 234. As illustrated in FIG. 3, this indication may be communicated in response to binary transmission option messages transmitted from the host 234 to the server 232, the binary transmission option messages having data appended thereto (Block 314). Because the client 214 and the terminal 212 may have already emulated the Telnet dialog necessary to prepare the terminal 212 to send or receive data, communication of an indication of readiness to communicate data between the terminal 212 and the host 234 (Block 315) may simply involve transferring data from the server 232 to client 214 previously transferred from the host 234 to the server 232, without any sort of explicit message.

As illustrated in FIG. 4, a variation on the above operations may involve communicating binary transmission messages from the host 234 and the server 232 (Blocks 317) and, in response, communicating an indication of readiness to communicate data between the host and the terminal (Block 315), e.g., as an explicit message indicating an end of negotiation on the link between the server 232 and the host 234. Data may subsequently flow between the terminal 212 and the host 234 via the client 214 and the server 232, in either direction. In a variation illustrated in FIG. 5, the indication of readiness to communicate data may flow from the client 214 to the server 232 (Block 315) in response to transmission of data from the terminal 212 (Block 321) after the terminal 212 and the client 214 have completed negotiation. The indication may be provided by transfer of this data between the client 214 and the server 232, with the data subsequently flowing to the host 234, which has already completed session negotiation with the server 232. Accordingly, those skilled in the art will appreciate that "communicating" as described herein may involve transfer of information in either direction, e.g., from client to server or vice versa.

Those skilled in the art will appreciate that numerous other variations of the operations of FIGS. 3–5 may be practiced within the scope of the present invention. For example, many of the dialogs (Blocks 306–308, Blocks 316–317, Blocks 310–311, and Blocks 312–313, among others) may repeatedly occur, dependent on responses of the various components involved. In addition, other types of Telnet dialogs may occur concurrent with the session establishment messages illustrated. According to another aspect, the transfer of terminal type information (Block 308) may also identify more than one terminal type. The terminal 212 and the client 214 may engage in multiple terminal type option dialogs (Blocks 306–307), resulting in communication of information identifying a number of different terminal types which may be supported by the terminal 212 to the client 214. This information may in turn be communicated to the server 232.

By buffering and emulating Telnet option messages at the client and server, the present invention can reduce the number of transfers which occur between the client and the server. Those skilled in the art will appreciate that although the manner in which transfers between the server and the client are achieved preferably includes sending data packets between the client and the server according to TCP, other protocols and data structures may be used with the present invention.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of establishing a session between a terminal and host, each of which are operative to communicate according to a communications protocol and to establish a session therebetween by exchanging a plurality of session establishment messages according to the communications protocol, the method comprising the steps of:

establishing a communications channel between the terminal and the host via a client and a server of a communications network, the client being connected to the terminal and the server being connected to the host;

communicating terminal type information from the client to the server via the communications channel;

communicating between the server and the client via the communications channel an indication of readiness to communicate data between the terminal and the host; and communicating messages between the client and the terminal and between the server and the host according to the communications protocol to emulate communication of the plurality of session establishment messages between the terminal and the host without requiring communication of the plurality of session establishment messages via the communications channel.

2. A method according to claim 1, wherein said step of establishing a communications channel comprises the step of communicating between the client and the server a confirmation of establishment of the communications channel.

3. A method according to claim 1, wherein said step of communicating between the server and client via the communications channel an indication of readiness to communicate data between the terminal and the host comprises the step of communicating an explicit message between the client and the server indicating readiness to communicate data between the terminal and the host.

4. A method according to claim 1, wherein said step of communicating between the server and client via the communications channel an indication of readiness to communicate data between the terminal and the host comprises the step of communicating data between the client and the server to implicitly indicate readiness to communicate data between the terminal and the host.

5. A method according to claim 1, wherein the communications network comprises a packet data network which operates according to a transmission control protocol (TCP), and wherein said step of establishing a communications channel comprises the step of opening a socket for TCP communication between the terminal and the host.

6. A method according to claim 1, wherein the communications protocol comprises a Telnet protocol.

7. A method according to claim 6, wherein said step of communicating messages comprises the step of communicating Telnet terminal type option, end of record option, and binary transmission option messages between the client and the terminal and between the server and the host.

8. A method according to claim 1, wherein the terminal comprises a terminal emulator resident on a first computer, wherein the client comprises a client application resident on the first computer, and wherein the server comprises a server application resident on a second computer.

9. A method of establishing a session between a terminal and a host over a communications medium, the terminal and the host each being operative to establish a session according to a Telnet logon protocol which includes a first number of transfers between a host and a terminal, the method comprising the step of:

establishing a session between the terminal and the host via the communications medium using a reduced protocol which comprises a mapping of the first number of transfers according to the Telnet logon protocol to a second number of transfers via the communications medium, the second number of transfers being less than the first number of transfers.

10. A method according to claim 9, wherein the second number of transfers comprises less than five transfers.

11. A method according to claim 10, wherein the less than five transfers include a first transfer establishing a communications channel between the host and the terminal via the communications medium, a second transfer confirming establishment of the communications channel, a third transfer of terminal type information, and a fourth transfer indicating readiness to communicate data between the host and the terminal.

12. A method according to claim 10, wherein the second number of transfers comprises less than four transfers.

13. A method according to claim 12, wherein the less than four transfers include a first transfer establishing a communications channel between the host and the terminal via the communications medium, a second transfer of terminal type information, and a third transfer indicating readiness to communicate data between the host and the terminal.

14. A method according to claim 9, wherein the reduced protocol comprises a mapping of terminal type option, binary transmission option and end of record option messages to the second number of transfers.

15. A method according to claim 9, wherein the communications medium comprises a client which is operative to communicate with the terminal according to the Telnet logon protocol and a server which is operative to communicate with the host according to the Telnet logon protocol, and wherein said step of establishing comprises the steps of:

communicating session establishment messages between the terminal and the client according to the Telnet logon protocol to thereby emulate communication of session establishment messages between the terminal and the host;

communicating session establishment messages between the host and the server according to the Telnet logon protocol to thereby emulate communication of session establishment messages between the terminal and the host; and conducting the second number of transfers between the client and the server.

16. A method according to claim 15, wherein the client and the server are operative to communicate according to a transmission control protocol (TCP), and wherein said step of conducting the second number of transfers comprises the step of conducting TCP transfers between the client and the server.

17. A method of mediating communications for a terminal operative to establish a session with a host by exchanging a plurality of session establishment messages with the host according to a logon protocol, the method comprising the following steps performed on a client of a communications network which is connected to the terminal:

establishing a communications channel to a server of the communications network;

transmitting the terminal type information to the server via the communications channel;

communicating with the server via the communications channel an indication of readiness to communicate data between the terminal and the host; and communicating messages with the terminal to emulate communication of the plurality of session establishment messages between the terminal and a host according to the logon protocol without requiring communication of the plurality of session establishment messages via the communications channel.

18. A method according to claim 17, wherein said step of communicating with the server via the communications channel an indication of readiness to communicate data between the terminal and the host comprises the step of communicating an explicit message indicating readiness to communicate data between the terminal and the host.

19. A method according to claim 17, wherein said step of communicating with the server via the communications channel an indication of readiness to communicate data between the terminal and the host comprises the step of communicating data with the server.

20. A method according to claim 17, wherein said step of establishing is preceded by the step of receiving a request to establish a session from the terminal.

21. A method according to claim 17, wherein the terminal is operative to communicate according to a Telnet protocol, and wherein said step of communicating messages comprises the step of communicating Telnet terminal type option, end of record option, and binary transmission option messages with terminal.

22. A method of mediating communications for a host the host operative to establish a session with a terminal by exchanging a plurality of session establishment messages with the terminal according to a logon protocol, the method comprising the following steps performed in a server of a communications network connected to the host:

establishing a communications channel to a client of the communications network;

receiving terminal type information from the client via the communications channel;

communicating with the client via the communications channel an indication of readiness to communicate data between the terminal and the host; and communicating messages with the host to emulate communication of the plurality of session establishment messages between the terminal and a host without requiring communication of the plurality of session establishment messages via the communications channel.

23. A method according to claim 22, wherein said step of communicating with the client via the communications channel an indication of readiness to communicate data between the terminal and the host comprises the step of communicating an explicit message indicating readiness to communicate data between the terminal and the host.

24. A method according to claim 22, wherein said step of communicating with the client via the communications channel an indication of readiness to communicate data between the terminal and the host comprises the step of communicating data with the client.

25. A method according to claim 22, wherein the communications network comprises a packet data network which operates according to a transmission control protocol (TCP).

26. A method according to claim 22, wherein the host is operative to communicate according to a Telnet protocol, and wherein said step of communicating messages comprises the step of communicating Telnet terminal type option, end of record option, and binary transmission option messages with host.

27. A system for interconnecting a terminal and a host, each of which are operative to communicate according to a communications protocol and to establish a session by exchanging a plurality of session establishment messages therebetween according to the communications protocol, the system comprising:

a communications network including a client connected to the terminal and a server connected to the host;

means for establishing a communications channel between the terminal and the host via said client and said server;

means for communicating terminal type information from said client to said server via said communications channel;

means for communicating between said server and said client via said communications channel an indication of readiness to communicate data between the terminal and the host; and means for communicating messages between said client and the terminal and between said server and the host according to the communications protocol to emulate communication of the plurality of session establishment messages between the terminal and the host without requiring communication of the plurality of session establishment messages over said communications channel.

28. A system according to claim 27, wherein said means for establishing a communications channel comprises means for communicating between said client and said server a confirmation of establishment of said communications channel.

29. A system according to claim 27, wherein said means for communicating between said server and said client via said communications channel an indication of readiness to communicate data between the terminal and the host comprises means for communicating an explicit message between said client and said server indicating readiness to communicate data between the terminal and the host.

30. A system according to claim 27, wherein said means for communicating between said server and client via said communications channel an indication of readiness to communicate data between the terminal and the host comprises means for communicating data between said client and said server to implicitly indicate readiness to communicate data between the terminal and the host.

31. A system according to claim 27, wherein said communications network comprises a packet data network which operates according to a transmission control protocol (TCP), and wherein said means for establishing a communications channel comprises means for opening a socket for TCP communication between the terminal and the host.

32. A system according to claim 27, wherein the communications protocol comprises a Telnet protocol.

33. A system according to claim 32, wherein said means for communicating messages comprises means for communicating Telnet terminal type option, end of record option, and binary transmission option messages between said client and the terminal and between said server and the host.

34. A system according to claim 27, wherein the terminal comprises a terminal emulator resident on a first computer, wherein said client comprises a client application resident on the first computer, and wherein said server comprises a server application resident on a second computer.

35. A system for interconnecting a terminal and a host, the terminal and the host each being operative to establish a session according to a Telnet logon protocol which includes a first number of transfers between a host and a terminal, the system comprising:

a communications medium; and means for establishing a session between the terminal and the host over said communications medium using a reduced protocol which comprises a mapping of the first number of transfers according to the Telnet logon protocol to a second number of transfers over said communications medium, said second number of transfers being less than the first number of transfers.

36. A system according to claim 35, wherein said second number of transfers comprises less than five transfers.

37. A system according to claim 36, wherein said less than five transfers include a first transfer establishing a communications channel between the host and the terminal over said communications medium, a second transfer confirming establishment of said communications channel, a third transfer of terminal type information, and a fourth transfer indicating readiness to communicate data between the host and the terminal.

38. A system according to claim 36, wherein said second number of transfers comprises less than four transfers.

39. A system according to claim 38, wherein said less than four transfers include a first transfer establishing a communications channel between the host and the terminal over said communications medium, a second transfer of terminal type information, and a third transfer indicating readiness to communicate data between the host and the terminal.

40. A system according to claim 35, wherein said reduced protocol comprises a mapping of terminal type option, binary transmission option and end of record option messages to said second number of transfers.

41. A system according to claim 35, wherein said communications medium comprises a client which is operative to communicate with the terminal according to the Telnet logon protocol and a server which is operative to communicate with the host according to the Telnet logon protocol, and wherein said means for establishing comprises:

means for communicating session establishment messages between the terminal and said client according to the Telnet logon protocol to thereby emulate communication of session establishment messages between the terminal and the host;

means for communicating session establishment messages between the host and said server according to the Telnet logon protocol to thereby emulate communication of session establishment messages between the terminal and the host; and means for conducting said second number of transfers between said client and said server.

42. A system according to claim 41, wherein said client and said server are operative to communicate according to a transmission control protocol (TCP), and wherein said means for conducting said second number of transfers comprises means for conducting TCP transfers between said client and said server.

43. A client for mediating communications for a terminal the terminal operative to establish a session with a host by exchanging a plurality of session establishment messages with the host according to a logon protocol, the client comprising:

means for establishing a communications channel to a server of a communications network connected to the client;

means for transmitting terminal type information to the server via said communications channel;

means for communicating with the server via said communications channel an indication of readiness to communicate data between the terminal and the host; and means for communicating messages with the terminal to emulate communication of the plurality of session establishment messages between the terminal and a host without requiring communication of the plurality of session establishment messages via said communications channel.

44. A client according to claim 43, wherein said means for communicating with the server via said communications channel an indication of readiness to communicate data between the terminal and the host comprises means for communicating an explicit message indicating readiness to communicate data between the terminal and the host.

45. A client according to claim 43, wherein said means for communicating with the server via said communications channel an indication of readiness to communicate data between the terminal and the host comprises means for communicating data with the server.

46. A client according to claim 43, wherein the communications network comprises a packet data network which operates according to a transmission control protocol (TCP), and wherein said means for establishing a communications channel comprises means for opening a socket for TCP communication with the server.

47. A client according to claim 43, wherein the terminal is operative to communicate according to a Telnet protocol, and wherein said means for communicating messages comprises means for communicating Telnet terminal type option, end of record option, and binary transmission option messages with the terminal.

48. A server for mediating communications for a host the host operative to establish a session with a terminal by exchanging a plurality of session establishment messages with the terminal according to a logon protocol, the server comprising:

means for establishing a communications channel to a client of a communications network connected to the server;

means for receiving terminal type information from the client via said communications channel;

means for communicating with the client via said communications channel an indication of readiness to communicate data between the terminal and the host; and means for communicating messages with the host to emulate communication of the plurality of session establishment messages between the terminal and a host without requiring communication of the plurality of session establishment messages via said communications channel.

49. A server according to claim 48, wherein said means for communicating with the client via said communications channel an indication of readiness to communicate data between the terminal and the host comprises means for communicating an explicit message indicating readiness to communicate data between the terminal and the host.

50. A server according to claim 48, wherein said means for communicating with the client via said communications channel an indication of readiness to communicate data between the terminal and the host comprises means for communicating data with the client.

51. A server according to claim 48, wherein the communications network comprises a packet data network which operates according to a transmission control protocol (TCP).

52. A server according to claim 48, wherein the host is operative to communicate according to a Telnet protocol, and wherein said means for communicating messages comprises means for communicating Telnet terminal type option, end of record option, and binary transmission option messages with the host.

53. A computer program product for establishing a session between a terminal and a host via a client and a server of a communications network, the terminal and the host each being operative to communicate according to a communications protocol and to establish a session by exchanging a plurality of session establishment messages therebetween according to the communications protocol, the computer program product comprising:

a computer-readable storage medium having computer-readable program code means embodied in said medium, said computer-readable program code means comprising:

computer-readable program code means for establishing a communications channel between the terminal and the host via the client and the server;

computer-readable program code means for communicating terminal type information from the client to the server via the communications channel;

computer-readable program code means for communicating between the server and the client via the communications channel an indication of readiness to communicate data between the terminal and the host; and computer-readable program code means for communicating messages between the client and the terminal and between the server and the host according to the communications protocol to emulate communication of the plurality of session establishment messages between the terminal and the host without requiring communication of the plurality of session establishment messages over the communications channel.

54. A computer program product according to claim 53, wherein said computer-readable program code means for establishing a communications channel comprises computer-readable program code means for communicating between the client and the server a confirmation of establishment of the communications channel.

55. A computer program product according to claim 53, wherein said computer-readable program code means for communicating between the server and the client via the communications channel an indication of readiness to communicate data between the terminal and the host comprises computer-readable program code means for communicating an explicit message between the client and the server indicating readiness to communicate data between the terminal and the host.

56. A computer program product according to claim 53, wherein said computer-readable program code means for communicating between the server and client via the communications channel an indication of readiness to communicate data between the terminal and the host comprises computer-readable program code means for communicating data between the client and the server to implicitly indicate readiness to communicate data between the terminal and the host.

57. A computer program product according to claim 53, wherein the communications network comprises a packet data network which operates according to a transmission control protocol (TCP), and wherein said computer-readable program code means for establishing a communications channel comprises computer-readable program code means for opening a socket for TCP communication between the terminal and the host.

58. A computer program product according to claim 53, wherein the communications protocol comprises a Telnet protocol, and wherein said computer-readable program code means for communicating messages comprises computer-readable program code means for communicating Telnet terminal type option, end of record option, and binary transmission option messages between the client and the terminal and between the server and the host.

59. A computer program product according to claim 53, wherein the terminal comprises a terminal emulator resident on a first computer, wherein the client comprises a client application resident on the first computer, and wherein the server comprises a server application resident on a second computer.

60. A computer program product for controlling communications between a terminal and a host over a communications medium, the terminal and the host each being operative to establish a session according to a Telnet logon protocol which includes a first number of transfers between a host and a terminal, the computer program product comprising:

a computer-readable storage medium having computer-readable program code means embodied in said medium, said computer-readable program code means comprising:

computer-readable program code means for establishing a session between the terminal and the host over the communications medium using a reduced protocol which comprises a mapping of the first number of transfers according to the Telnet logon protocol to a second number of transfers over the communications medium, the second number of transfers being less than the first number of transfers.

61. A computer program product according to claim 60, wherein the second number of transfers comprises less than five transfers.

62. A computer program product according to claim 61, wherein the less than five transfers include a first transfer establishing a communications channel between the host and the terminal over the communications medium, a second transfer confirming establishment of the communications channel, a third transfer of terminal type information, and a fourth transfer indicating readiness to communicate data between the host and the terminal.

63. A computer program product according to claim 61, wherein the second number of transfers comprises less than four transfers.

64. A computer program product according to claim 63, wherein the less than four transfers include a first transfer establishing a communications channel between the host and the terminal over the communications medium, a second transfer of terminal type information, and a third transfer indicating readiness to communicate data between the host and the terminal.

65. A computer program product according to claim 60, wherein the reduced protocol comprises a mapping of terminal type option, binary transmission option and end of record option messages to the second number of transfers.

66. A computer program product according to claim 60, wherein the communications medium comprises a client which is operative to communicate with the terminal according to the Telnet logon protocol and a server which is operative to communicate with the host according to the Telnet logon protocol, and wherein said computer-readable program code means for establishing comprises:

computer-readable program code means for communicating session establishment messages between the terminal and the client according to the Telnet logon protocol to thereby emulate communication of session establishment messages between the terminal and the host according to the Telnet logon protocol; computer-readable program code means for communicating session establishment messages between the host and the server according to the Telnet logon protocol to thereby emulate communication of session establishment messages between the terminal and the host; and
  computer-readable program code means for conducting the second number of transfers between the client and the server.

67. A computer program product according to claim 66, wherein the client and the server are operative to communicate according to a transmission control protocol (TCP), and wherein said computer-readable program code means for conducting the second number of transfers comprises computer-readable program code means for conducting TCP transfers between the client and the server.

68. A computer program product for controlling a client which mediates communications of a terminal operative to establish a session with a host by exchanging a plurality of session establishment messages with the host according to a logon protocol, the computer program comprising;

a computer-readable storage medium having computer-readable program code means embodied in said medium, said computer-readable program code means comprising:
    computer-readable program code means for establishing a communications channel to a server of a communications network connected to the client;
    computer-readable program code means for transmitting terminal type information to the server via the communications channel;
    computer-readable program code means for communicating with the server via the communications channel an indication of readiness to communicate data between the terminal and the host; and
    computer-readable program code means for communicating messages with the terminal to emulate communication of the plurality of session establishment messages between the terminal and a host without requiring communication of the plurality of session establishment messages via the communications channel.

69. A computer program product according to claim 68, wherein said computer-readable program code means for communicating with the server via the communications channel an indication of readiness to communicate data between the terminal and the host comprises computer-readable program code means for communicating an explicit message indicating readiness to communicate data between the terminal and the host.

70. A computer program product according to claim 68, wherein said computer-readable program code means for communicating with the server via the communications channel an indication of readiness to communicate data between the terminal and the host comprises computer-readable program code means for communicating data with the server.

71. A computer program product according to claim 68, wherein the communications network comprises a packet data network which operates according to a transmission control protocol (TCP), and wherein said computer-readable program code means for establishing a communications channel comprises computer-readable program code means for opening a socket for TCP communication with the server.

72. A computer program product according to claim 68, wherein the terminal is operative to communicate according to a Telnet protocol, and wherein said computer-readable program code means for communicating messages comprises computer-readable program code means for communicating Telnet terminal type option, end of record option, and binary transmission option messages with the terminal.

73. A computer program product for controlling a server which mediates communications of a host operative to establish a session with a terminal by exchanging a plurality of session establishment messages with the terminal according to a logon protocol, the computer program product comprising:

a computer-readable storage medium having computer-readable program code means embodied in the medium, said computer-readable program code means comprising:
    computer-readable program code means for establishing a communications channel to a client of a communications network connected to the server;
    computer-readable program code means for receiving terminal type information from the client via the communications channel;
    computer-readable program code means for communicating with the client via the communications channel an indication of readiness to communicate data between the terminal and the host; and
    computer-readable program code means for communicating messages with the host to emulate communication of the plurality of session establishment messages between the terminal and a host without requiring communication of the plurality of session establishment messages via the communications channel.

74. A computer program product according to claim 73, wherein said computer-readable program code means for communicating with the client via the communications channel an indication of readiness to communicate data between the terminal and the host comprises computer-readable program code means for communicating an explicit message indicating readiness to communicate data between the terminal and the host.

75. A computer program product according to claim 73, wherein said computer-readable program code means for communicating with the client via the communications channel an indication of readiness to communicate data between the terminal and the host comprises computer-readable program code means for communicating data with the client.

76. A computer program product according to claim 73, wherein the communications network comprises a packet data network which operates according to a transmission control protocol (TCP).

77. A computer program product according to claim 73, wherein the host is operative to communicate according to a Telnet, and wherein said computer-readable program code means for communicating messages comprises computer-readable program code means for communicating Telnet terminal type option, end of record option, and binary transmission option messages with the host.

\* \* \* \* \*